(12) United States Patent
McCauley et al.

(10) Patent No.: US 8,974,721 B2
(45) Date of Patent: Mar. 10, 2015

(54) CONTROL OF FIRED SHAPE BY PIECE ORIENTATION

(75) Inventors: Daniel Edward McCauley, Watkins Glen, NY (US); Anthony Nicholas Rodbourn, Avoca, NY (US); David Robertson Treacy, Jr., Horseheads, NY (US); Casey Allen Volino, Tioga, PA (US)

(73) Assignee: Corning Incorporated, Corning, NY (US)

( * ) Notice: Subject to any disclaimer, the term of this patent is extended or adjusted under 35 U.S.C. 154(b) by 281 days.

(21) Appl. No.: 13/564,005

(22) Filed: Aug. 1, 2012

(65) Prior Publication Data

US 2013/0049243 A1    Feb. 28, 2013

Related U.S. Application Data

(60) Provisional application No. 61/527,272, filed on Aug. 25, 2011.

(51) Int. Cl.
*B29C 35/00* (2006.01)
*C04B 38/00* (2006.01)

(52) U.S. Cl.
CPC ............. *B29C 35/00* (2013.01); *C04B 38/0006* (2013.01)

USPC ............ 264/630; 264/631; 264/605; 264/606

(58) Field of Classification Search
CPC .................................... C04B 38/0006–38/0019
USPC .................................. 264/605–609, 630, 631
See application file for complete search history.

(56) References Cited

U.S. PATENT DOCUMENTS

| | | | | |
|---|---|---|---|---|
| 6,099,793 A * | 8/2000 | Dull et al. | ...................... | 264/631 |
| 6,287,509 B1 * | 9/2001 | Gheorghiu | ..................... | 264/630 |
| 6,325,963 B1 * | 12/2001 | Dull et al. | ....................... | 264/631 |
| 7,824,602 B2 | 11/2010 | Sachs et al. | .................... | 264/638 |
| 7,887,897 B2 | 2/2011 | Lu et al. | ......................... | 428/116 |
| 7,892,623 B2 | 2/2011 | Ohno et al. | .................... | 428/116 |
| 2002/0003322 A1 * | 1/2002 | Dull et al. | ...................... | 264/630 |
| 2011/0049741 A1 | 3/2011 | Brown et al. | ................ | 264/40.1 |

* cited by examiner

*Primary Examiner* — Joseph S Del Sole
*Assistant Examiner* — Russell Kemmerle, III
(74) *Attorney, Agent, or Firm* — Charles A. Greene

(57) ABSTRACT

A method of making ceramic bodies includes systematically orienting the bodies during firing relative to a temperature gradient in a kiln. The systematic orientation of the bodies relative to the temperature gradient can allow for an average deviation of a measured shape of the ceramic bodies from a predetermined target contour shape to be less than what they would be if the bodies were oriented randomly relative to the temperature gradient.

21 Claims, 5 Drawing Sheets

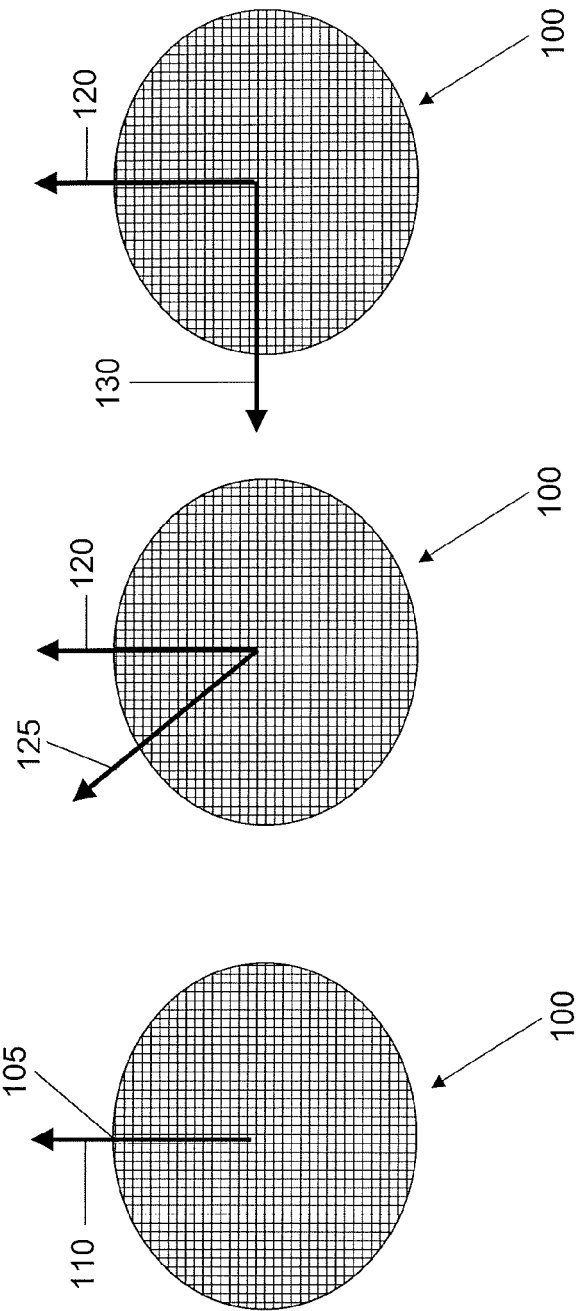

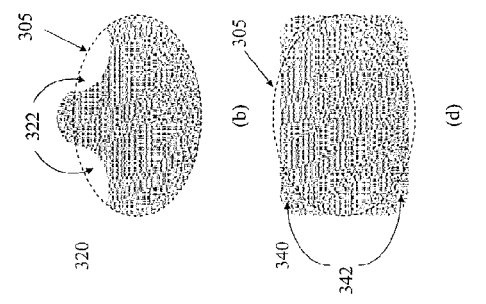
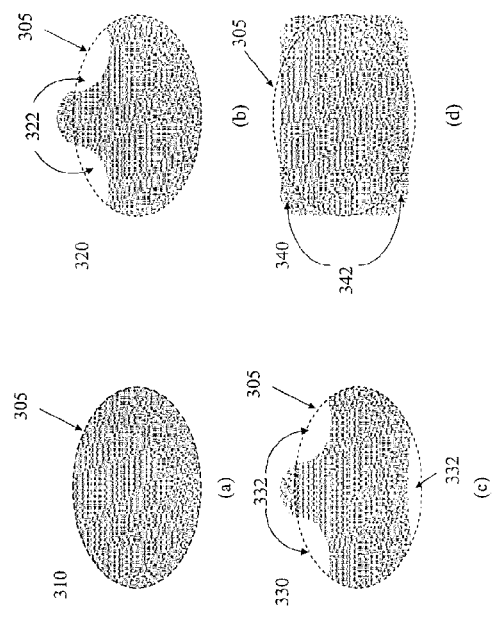
FIG. 2A  FIG. 2B
FIG. 2C  FIG. 2D

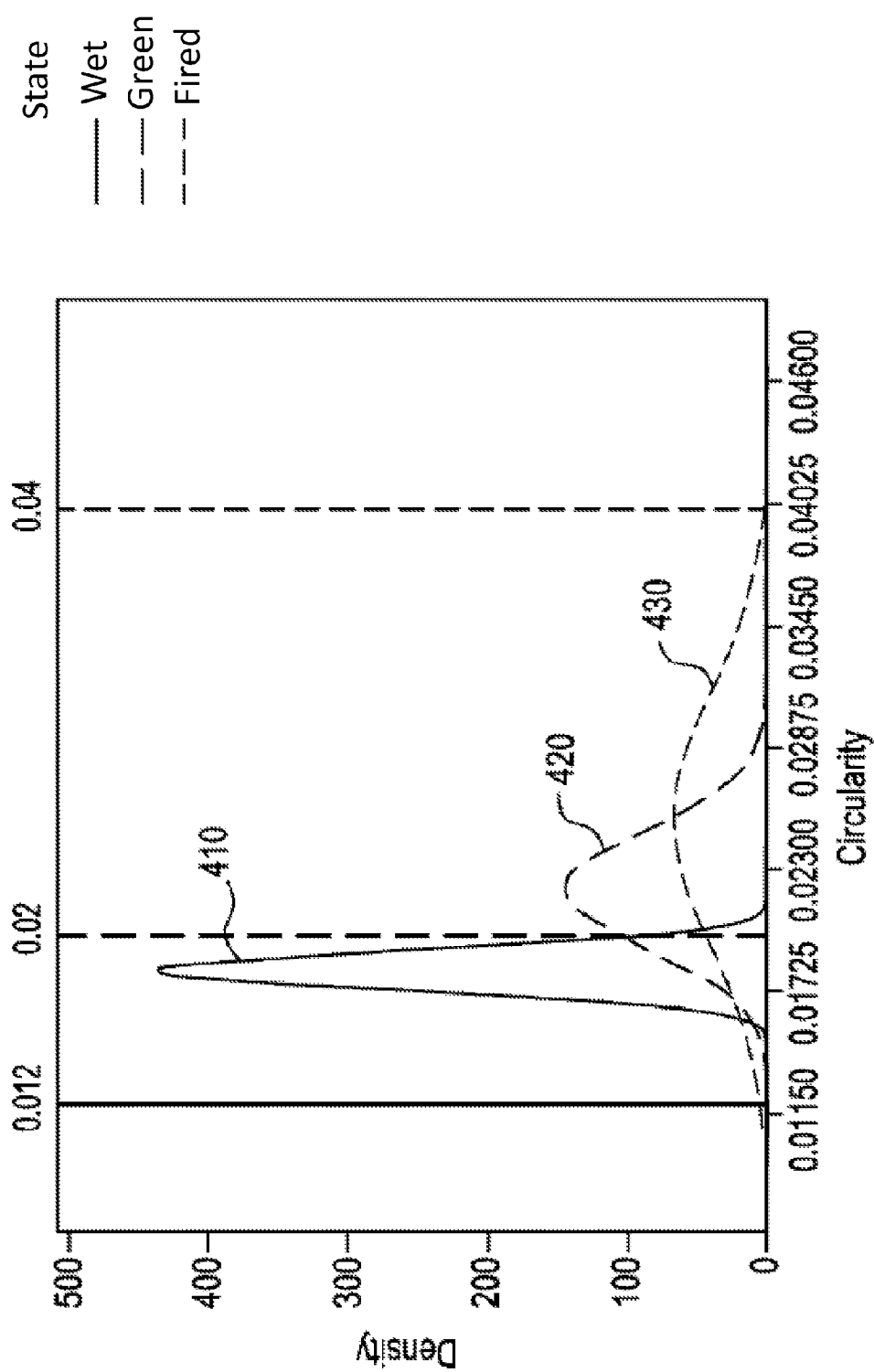

Circularity Average

Circularity Std Deviation

CONTROL OF FIRED SHAPE BY PIECE ORIENTATION

This application claims the benefit of priority under 35 USC §119 of U.S. Provisional Application Ser. No. 61/527,272 filed on Aug. 25, 2011 the content of which is relied upon and incorporated herein by reference in its entirety.

BACKGROUND

The disclosure relates generally to methods of firing ware to produce porous ceramic articles and particularly to methods of controlling the shape of porous ceramic articles through orientation of ware during firing.

In the manufacture of ceramic bodies, the bodies are typically extruded, dried, and fired to meet a predetermined target contour shape (e.g., having a circular or elliptical cross section). However, during such manufacture, the green bodies produced after extruding and drying have shapes with varying amounts of deviation or "mis-shape" from the predetermined target contour shape (e.g., a "slump-type" mis-shape or a "slide-type" mis-shape). This mis-shape characteristic tends to be augmented during firing such that the resulting ceramic bodies have even more overall deviation from the predetermined target contour shape than the green bodies. In the meantime, customer specifications and dimensional requirements for ceramic articles, such as those used in mobile emissions exhaust gas after treatment systems, continue to be tighter and tighter.

SUMMARY

One embodiment of the disclosure relates to a method of making ceramic bodies. The method includes extruding green bodies, the green bodies being extruded to a predetermined target contour shape. A measured shape of at least some of the green bodies at least partially deviates from the predetermined target contour shape. The method also includes firing the green bodies in a kiln to make ceramic bodies. During firing, the green bodies are oriented relative to a temperature gradient in the kiln such that an average deviation of a measured shape of the ceramic bodies from the predetermined target contour shape is less than the average deviation of the measured shape of the green bodies from the predetermined target contour shape.

Another embodiment of the disclosure relates to a method of making ceramic bodies. The method includes extruding green bodies, the green bodies being extruded to a predetermined target contour shape. A measured shape of at least some of the green bodies at least partially deviates from the predetermined target contour shape. The method also includes firing the green bodies in a kiln to make ceramic bodies. During firing, at least a majority of the green bodies are oriented in the same direction relative to a temperature gradient in the kiln.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 1A-C illustrate top-down, two-dimensional views of a cylindrically-shaped ceramic article having an orientation or travel direction relative to a temperature gradient;

FIGS. 2A-D illustrate schematic representations of exemplary shape families relative to a target contour shape;

FIG. 3 plots circularity for a group of wet, green, and fired bodies using a prior art process;

DETAILED DESCRIPTION

Figure 4:
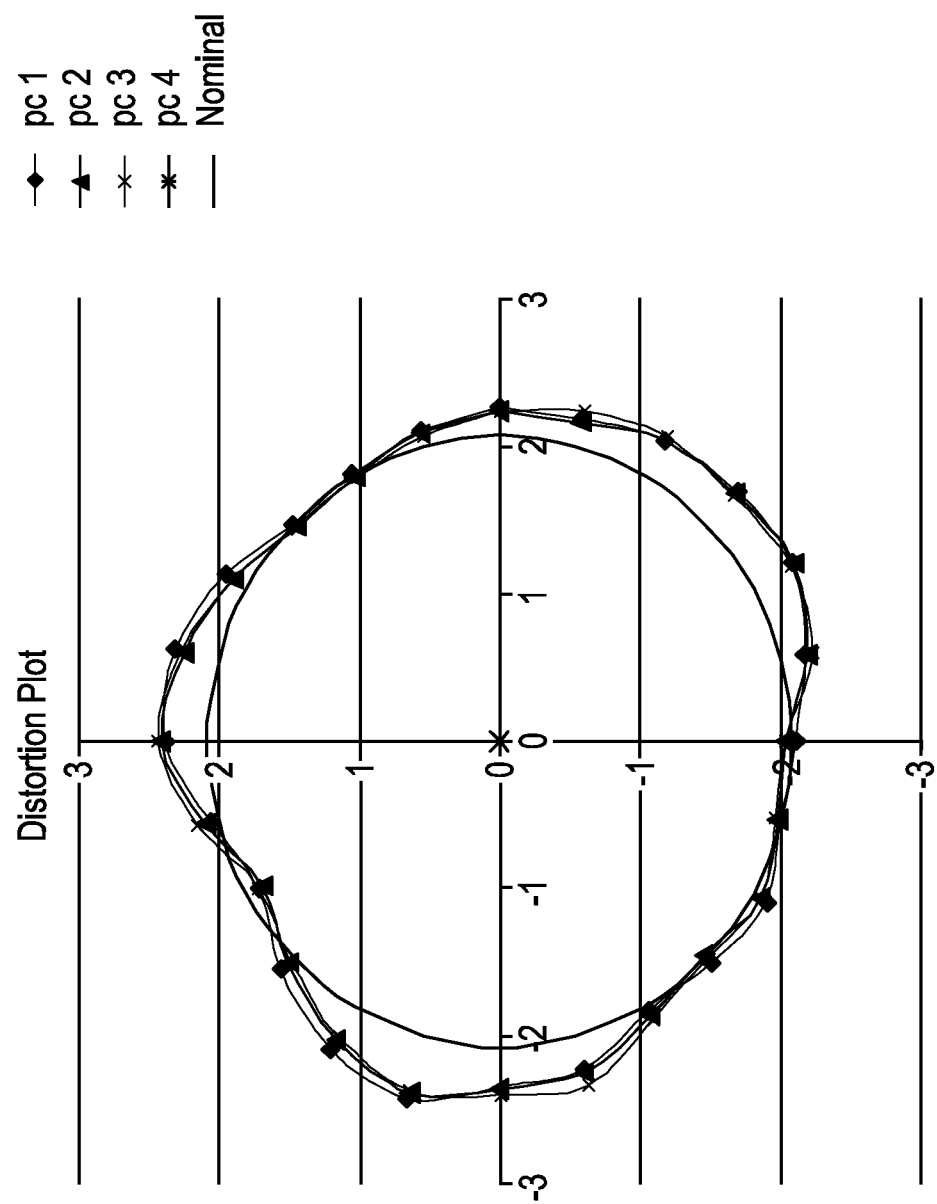
FIG. 4 plots the measured cross section using principal component analysis (PCA) of a part having a generally elliptical target contour shape.

Various embodiments of the disclosure will be described in detail with reference to the drawings, if any.

As used herein, "target contour shape" refers to the ideal, desired shape that a ceramic article is intended to be manufactured to match, such as the ideal, desired shape that a face or cross-section of a ceramic article is intended to be manufactured to match. Such a face or cross-section may, for example, ideally be oval, polygonal, or circular. While the description of contour shapes and deviations form contour shapes most typically relates to oval or elliptical shapes, contours, and/or profiles, it is understood that the methods described herein are equally applicable to other contours such as, but not limited to, cylindrical or circular shapes, polygonal (square, rectangular, hexagonal, octahedral) shapes, and the like.

As used herein, the term "temperature gradient" refers to the direction the temperature changes the most rapidly around a particular location or object. Assuming that temperature (T) is a single-valued, continuous, and differentiable function of three-dimensional space, i.e., $$T = T(x,y,z),$$

wherein x, y, and z are the coordinates of the location of interest, then the temperature gradient is the vector quantity defined as:

$$\nabla T = \left(\frac{\partial T}{\partial x}, \frac{\partial T}{\partial y}, \frac{\partial T}{\partial z}\right)$$

For example, in a tunnel kiln, the temperature gradient is often aligned with or parallel to the direction of travel through the kiln.

As used herein, when a temperature gradient is referenced as being aligned with a feature on an object, such as an extrusion line on a green body or ceramic article, that feature generally intersects the temperature gradient while facing the direction in which the temperature is increasing. An example of this is shown in FIG. 1A, which illustrates a top down, two-dimensional view of a cylindrically-shaped ceramic article 100, wherein 105 represents an extrusion line on the article and arrow 110 represents a temperature gradient. As can be seen, extrusion line 105 intersects temperature gradient 110 and faces the direction in which the temperature is increasing.

As used herein, the term "oblique" refers to an angle or relationship that is neither parallel nor perpendicular. For example, if a temperature gradient is referenced as being oblique relative to the direction an object, such as a green body or ceramic article, is being moved, then vectors representing the temperature gradient and direction of travel are not parallel or perpendicular to each other. An example of this is shown in FIG. 1B, which illustrates a top down, two-dimensional view of a cylindrically-shaped ceramic article 100, wherein arrow 120 represents the direction of travel and arrow 125 represents a temperature gradient.

As used herein, the term "normal" refers to an angle or relationship that is generally perpendicular in a two-dimensional plane. For example, if a temperature gradient is referenced as being normal relative to the direction an object, such as a green body or ceramic article, is being moved, then vectors representing the temperature gradient and direction of travel are generally perpendicular to each other. An example of this is shown in FIG. 1C, which illustrates a top down, two-dimensional view of a cylindrically-shaped ceramic article 100, wherein arrow 120 represents the direction of travel and arrow 130 represents a temperature gradient.

Deviation or at least partial deviation from a target contour shape refers to the differences in the actual shape of a ceramic article or its precursors (e.g., green body, wet body, etc.) as compared to the target contour shape. For example, circularity is defined as the maximum radial deviation from the target contour shape minus the minimum radial deviation from the target contour shape.

Deviations of actual contour shape from a target contour shape can be determined by measurement techniques, such as laser gauge coordinate measurement (LGCM) techniques, which utilize measurements obtained from laser gauge coordinate measurement machines (LGCMM), which are known in the art. Such measurement techniques can yield a variety of types of parameters that are used to characterize ways in which a shape may deviate from a target contour shape. For example, template is a LGCMM parameter that represents the largest contour that can be completely contained within the measured part periphery, whereas tubegauge is the smallest contour that can completely contain the measured part periphery.

Another analysis technique that can be used to characterize deviation of a measured body from a target contour shape involves principal component analysis (PCA). Use of PCA to characterize ways in which a shape may deviate from a target contour shape is described in U.S. patent application publication no. 2011/0049741, the entire disclosure of which is incorporated herein by reference.

Deviations of a ceramic body from a target contour shape frequently arise during formation of the ceramic body, particularly when the ceramic body is in a pliant or semi-fluidic state. In extrusion processes, for example, the profile of the "flow-front" of the ceramic material with respect to the flow or extrusion direction through the extrusion barrel can affect the shape of the cross section of the extruded body.

Deviations of a ceramic body from a target contour shape can give rise to exemplary classifications of ways in which ceramic bodies commonly deviate from a given target contour shape, sometimes referred to as "shape families." As used herein, the term "shape family" refers to a specific pattern of deviations about a target contour shape. Exemplary shape families are shown in FIG. 2A-D. The shape families shown in FIGS. 2A-D are independent of each other, and can be combined to yield other shape families. It will be appreciated by those skilled in the art that the shape families shown in FIGS. 2A-D are non-limiting examples of possible shape families. Shape families other than those shown in FIGS. 2A-D exist and such contours are considered to be within the scope of the present disclosure. Similarly, shape families for other target contours, while not described herein, are considered to be within the scope of the present disclosure.

FIG. 2A represents a shape 310 that shows no systematic pattern of deviations from the target contour shape, other than all points on the contour deviate in one direction from the target shape. FIG. 2B is a "horizontal/vertical" shape 320, in which two portions 322 are "squeezed in" so as to produce negative deviations from the target contour shape 305 and a third portion between the squeezed in portions 322 is "popped out" to deviate positively from the target contour 305. FIG. 2C is a "pull in" shape 330, in which three portions 332 of the body are "squeezed in," deviating negatively from the target contour shape 305 and a third portion between two of the squeezed portions 332 is "popped out" to deviate positively from the target contour 305. FIG. 2D is a "pull out" shape 340, is which portions 342 of the body are "pulled out," deviating positively from the target contour shape 305 to provide a more rectangular or boxy shape than the target contour shape.

When a group of ceramic bodies are produced, it is common for a number of them to show deviations from the target contour shape, which may be according to one or more of the shape families discussed herein. When these deviations are measured for a group of bodies, using, for example, one or more of the measurement techniques disclosed herein, an average amount of deviation per body from the target contour shape can be calculated.

After extrusion, wet bodies are typically dried to produce green bodies, which are then fired to produce ceramic bodies. During these processing stages, it is typical for not only the average amount of deviation from the target contour shape of a group of bodies to increase but also for the variability (e.g., standard deviation) of the group of bodies to increase. FIG. 3 graphically illustrates this progression, in which "circularity" was determined for a group of parts that were extruded, dried, and then fired. Increased circularity corresponds to greater overall deviation from the target contour shape. Curve 410 in FIG. 3 shows circularity data for the bodies in a wet state. Curve 420 shows circularity data for the bodies in a green (i.e., after drying) state. Curve 430 shows circularity for ceramic bodies after firing. As can be seen, deviations from a target contour shape that are first seen in wet bodies following extrusion, tend to become augmented following drying and firing. Specifically, the average circularity of the wet bodies was calculated as 0.0183, the average circularity of the green bodies was calculated as 0.0221, and the average circularity of the fired bodies was calculated as 0.0253. The standard deviation of the wet bodies with respect to circularity was 0.00091, the standard deviation of the green bodies was 0.00275, and the standard deviation of the fired bodies was 0.00586.

With respect to firing, the augmentation or increase in the average deviation from a predetermined target contour shape can be expected to occur if no attention is made to the orientation of the ware in the kiln relative to a temperature gradient in the kiln (e.g., when the ware is oriented in random directions relative to the temperature gradient).

In contrast, applicants have surprisingly found that when green bodies are systematically oriented relative to a temperature gradient in the kiln, an average deviation of a measured shape of the resulting fired ceramic bodies from a predetermined target contour shape can be less than the average deviation of the measured shape of the green bodies from the predetermined target contour shape. This can allow for the production of ceramic bodies, wherein a higher percentage of the ceramic bodies meet customer specifications or, in other words, the number of selects is increased, providing for potentially significant cost savings. It may also reduce the occurrence of other fired relating defects such as fissures or unacceptable thermal shock.

The orientation of the green bodies relative to the thermal gradient in a kiln can relate to the "shape family" or deviation pattern from the target contour shape exhibited by the green bodies. Following extrusion and drying, it is common for a majority (or at least a plurality) of green bodies from a given batch of material under a given set of extrusion conditions to exhibit a systematic pattern of deviations from a target contour shape consistent with a commonly identified shape family, such as the exemplary families discussed above. When this is observed during production, the green bodies can be oriented in a direction relative to the temperature gradient in the kiln in a manner that effectively counteracts during firing, the mis-shape previously imparted into the bodies, thereby mitigating, with respect to the group of bodies as a whole, the overall amount of deviation from the target contour shape.

In certain exemplary embodiments, at least a majority of the green bodies can be oriented in the same direction relative to the temperature gradient in the kiln. For example at least 60%, and further such as at least 70%, and yet further such as at least 80%, and still yet further such as at least 90% of the green bodies can be oriented in the same direction relative to the temperature gradient in the kiln. In certain exemplary embodiments, all of the green bodies are oriented in the same direction relative to the temperature gradient in the kiln.

For example, for green bodies exhibiting mis-shape patterns illustrated in FIG. 2C, applicants have surprisingly found that orienting the green bodies during firing such that, as the bodies enter the kiln, the popped out portion between the two squeezed in portions is aligned with the temperature gradient, can result in the average deviation of a measured shape of the resulting ceramic bodies from the predetermined target contour shape being less than the average deviation of the measured shape of the green bodies from the predetermined target contour shape. This finding is discussed in more detail in the example below.

In certain exemplary embodiments, the green bodies comprise an extrusion line that extends generally parallel to their longitudinal axis along a length of their outer circumference. Applicants have found that when green bodies exhibit mis-shape patterns illustrated in FIG. 2C, the extrusion line often intersects the popped out portion between the two squeezed in portions. Accordingly, the green bodies can be placed in the kiln such that the extrusion line is aligned with the temperature gradient. The extrusion line can be aligned with the temperature gradient for at least a majority of the green bodies placed in the kiln, such as for all of the green bodies placed in the kiln.

Methods disclosed herein can apply to ceramic bodies formed in tunnel kilns as well as ceramic bodies formed in other types of kilns, such as periodic kilns.

When a tunnel kiln is utilized, the green bodies are generally moved in a direction through the tunnel kiln and the temperature gradient can be approximately parallel to the direction the green bodies are moved. When the green bodies comprise an extrusion line, such as described above, the extrusion line, in exemplary embodiments, can face the direction the green bodies are moved. The extrusion line can face the direction the green bodies are moved for at least a majority of the green bodies placed in the tunnel kiln, including for all the green bodies placed in the tunnel kiln.

When a periodic kiln is utilized and the green bodies comprise an extrusion line, the extrusion line can be aligned with the temperature gradient. The extrusion line can be aligned with the temperature gradient for at least a majority of the green bodies placed in the kiln, including for all of the green bodies placed in the kiln.

In addition to the shape patterns described herein, such as those set forth in FIGS. 2A-D, other shape patterns may also exist following extrusion. FIG. 4 plots the measured cross section of a part using principal component analysis (PCA). As can be seen from FIG. 4, the part exhibits two popped out portions that are in an approximate 90 degree relationship to each other.

In these and other instances, the temperature gradient and the direction that parts are oriented relative to it, can be modified in various ways to allow for an average deviation of a measured shape of the ceramic bodies from a predetermined target contour shape to be less than an average deviation of a measured shape of the corresponding green bodies from the predetermined target contour shape For example, when a tunnel kiln is used, such that the green bodies are moved in a direction in the tunnel kiln, a temperature gradient can be introduced that is normal or oblique relative to the direction the ware is moved for at least part of the time the ware is in the kiln, including for all of the time the ware is in the kiln.

For example, in at least one set of exemplary embodiments, a second temperature gradient can be dynamically introduced to the kiln, wherein the second temperature gradient is generally normal or perpendicular to a first temperature gradient, wherein the first temperature gradient is, for example, generally parallel to the direction the ware is moved. The combination of both temperature gradients may yield an overall temperature gradient that is oblique to the direction the ware is moved.

The second temperature gradient may be present for all or only part of the time the ware is in the kiln. For example, at a first given time, T1, when the ware is at a certain location in the kiln, the ware may only be exposed to the first temperature gradient. At a second given time, T2, when the ware is at a different location in the kiln, the ware may be exposed to the first temperature gradient and the second temperature gradient simultaneously. The inverse may also occur. At a first given time, T1, when the ware is at a certain location in the kiln, the ware may be exposed to the first and second temperature gradient simultaneously. At a second given time, T2, when the ware is at a different location in the kiln, the ware may only be exposed to the first temperature gradient.

The same general principles discussed above with respect to tunnel kilns and second temperature gradients can also be applied to other types of kilns, such as periodic kilns. When in a periodic kiln (as well as a tunnel kiln), a reference point to orient the ware relative to temperature gradients can be, for example, an extrusion line, as discussed above. Thus, in a periodic kiln, the extrusion line can not only be aligned with the temperature gradient, but can also be normal or oblique relative to the temperature gradient.

The second temperature gradient may be present for all or only part of the time the ware is in the kiln. For example, at a first given time, T1, the ware may only be exposed to the first temperature gradient. At a second given time, T2, the ware may be exposed to the first temperature gradient and the second temperature gradient simultaneously. The inverse may also occur. At a first given time, T1, the ware may be exposed to the first and second temperature gradient simultaneously. At a second given time, T2, the ware may only be exposed to the first temperature gradient.

In either tunnel or periodic kilns, the second temperature gradient can be dynamically introduced to the kiln by any means that would, for example, cause the left side of the kiln to be hotter than the right side or the right side of the kiln to be hotter than the left side, relative to a reference point or direction (such an extrusion line or the direction of travel of ware through a tunnel kiln). The second temperature gradient does not need to exist at the same time (or the same place) in every instance, depending on, for example, the shape characteristics of the green bodies being introduced to the kiln. For example, a first group of green bodies exhibiting a predominant type of shape characteristics (or shape family) may call for a second temperature gradient to be introduced to the kiln at one or more times (or locations) whereas a second group of green bodies exhibiting a different predominant type of shape characteristics (or shape family) may call for a second temperature gradient to be introduced to the kiln at one or more times (or locations) that are at least in some respect different from the times (or locations) introduced to the first group.

In either tunnel or periodic kilns, the magnitude and direction of the second temperature gradient may also vary in different situations. For example, a group of green bodies exhibiting a predominant type of shape characteristic (or shape family) may call for additional temperature gradients to be introduced at different times (or locations), wherein at least one of the additional temperature gradients is higher than the other. Alternatively, a group of green bodies exhibiting a predominant type of shape characteristic (or shape family) may call for additional temperature gradients to be introduced at different times (or locations), wherein, for example, at least one of the additional temperature gradients causes the kiln to be hotter right to left and at least one of the additional temperature gradients causes the kiln to be hotter left to right.

The disclosure is not limited to the production of any particular type of ceramic body and can be used in the manufacture of ceramic bodies comprising at least one of cordierite, aluminum titanate (AT), mullite, alumina ($Al_2O_3$), zircon, alkali and alkaline-earth alumino-silicates, spinels, persovskites, zirconia, ceria, silicon carbide (SiC), silicon nitride ($Si_3N_4$), silicon aluminum oxynitride (SiAlON), and zeolites. Raw materials and ingredients used to make such ceramics include those known to those skilled in the art.

The ingredients may be mixed in a muller or plow blade mixer. A solvent may be added in an amount that is less than is needed to plasticize the batch. With water as the solvent, the water hydrates the binder and the powder particles. The surfactant and/or oil lubricant, if desired, may then be added to the mix to wet out the binder and powder particles.

The precursor batch may then be plasticized by shearing the wet mix formed above in any suitable mixer in which the batch will be plasticized, such as, but not limited to, a twin-screw extruder/mixer, auger mixer, muller mixer, or double arm, etc. Extent of plasticization is dependent on the concentration of the components (e.g., binder, solvent, surfactant, oil lubricant and/or the inorganics), temperature of the components, the amount of work put in to the batch, the shear rate, and extrusion velocity.

In a further step, the composition may be extruded to form a green honeycomb body. Extrusion may be done with devices that provide low to moderate shear. For example hydraulic ram extrusion press or two stage de-airing single auger are low shear devices. A single screw extruder is a moderate shear device. The extrusion may be vertical or horizontal.

It will be appreciated that honeycomb bodies disclosed herein may have any convenient size and shape and the disclosed embodiments are applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/$cm^2$ (1500 cells/$in^2$) to about 15 cells/$cm^2$ (100 cells/$in^2$). Examples of honeycombs produced by the process of the present invention, although it is to be understood that the invention is not limited to such, may be those having about 94 cells/$cm^2$ (about 600 cells/$in^2$), or about 62 cells/$cm^2$ (about 400 cells/$in^2$) each having wall thicknesses of about 0.1 mm (4 mils). Typical wall thicknesses may be from about 0.07 to about 0.6 mm (about 3 to about 25 mils), including from about 0.18 to 0.33 mm (about 7 to about 13 mils), although thicknesses of about 0.02-0.048 mm (1-2 mils) are also possible.

The disclosure and scope of the appended claims will be further clarified by the following examples.

EXAMPLE

Figure 5A:
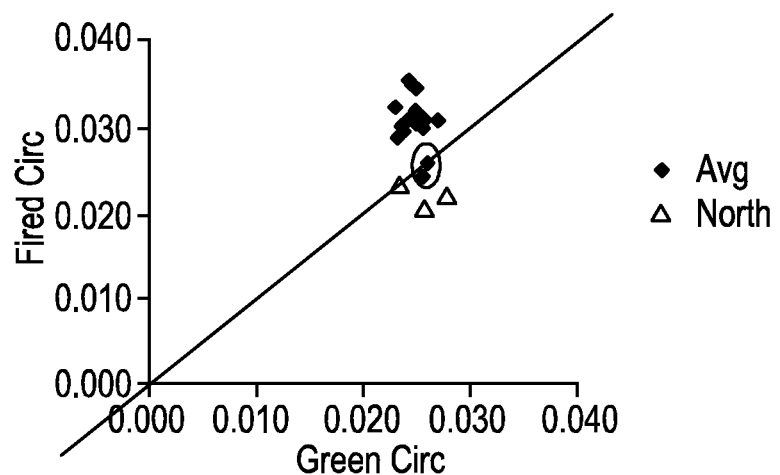
FIGS. 5A-B plot the average circularity and circularity standard deviation of green and fired bodies oriented uniformly and randomly relative to a temperature gradient in a kiln.
Figure 5B:
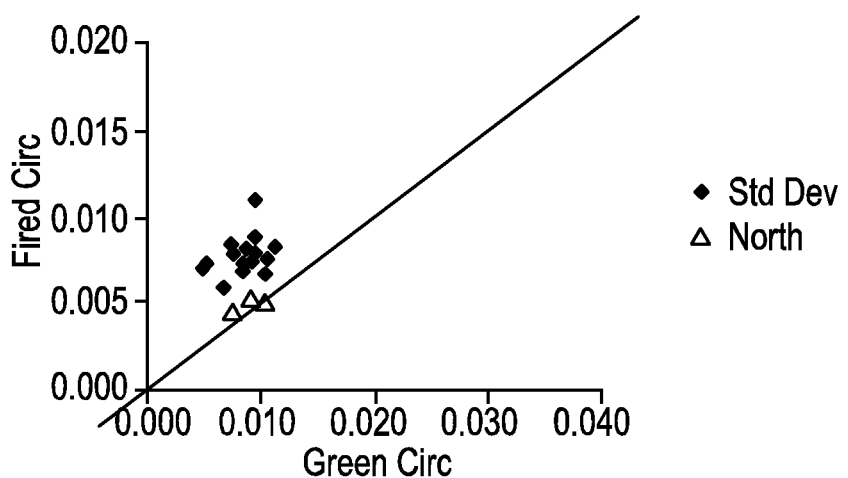

A tunnel kiln included a temperature gradient parallel to the direction in which the green wares traveled through the kiln. Green cordierite bodies, generally exhibiting characteristics of the shape family illustrated in FIG. 2C, were fired into ceramic bodies in the kiln by placing a plurality of bodies on 20 cars, wherein on 17 cars, the green bodies were oriented randomly and on the other 3 cars, the green bodies were all oriented such that their extrusion lines faced the direction the green bodies were moved through the kiln (i.e., the extrusion line on each green body was generally aligned with the temperature gradient as the green bodies entered the kiln). Dimensional characteristics were measured for each green body prior to entering the kiln and each ceramic body subsequent to exiting the kiln using laser gauge coordinate measurements (LGCM), and the circularity of each green and ceramic body was determined using the a plurality of points around the periphery of each green and ceramic body. FIG. 5A plots the average circularity of the green and fired bodies and FIG. 5B plots the circularity standard deviation of the green and fired bodies. As can be seen from FIG. 5A, the average circularity of the ware oriented on the 3 cars such that their extrusion lines all faced the direction of travel (indicated by triangles) had a lower average circularity as fired bodies than as green bodies (i.e., their average deviation from the predetermined target contour shape subsequent to firing was less than their average deviation from the predetermined target contour shape prior to firing). Subsequent to firing, they also had a lower average circularity than the ware oriented randomly on the other 17 cars (indicated by diamonds), wherein the ware oriented randomly on the other 17 cars had a higher average circularity as fired bodies than as green bodies.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, subcombinations and variations of the disclosed embodiments incorporating the spirit and substance of the disclosure may occur to persons skilled in the art, the disclosure should be construed to include everything within the scope of the appended claims and their equivalents.

What is claimed is:

1. A method of making ceramic bodies, the method comprising:
    extruding green bodies, said green bodies being extruded to a predetermined target contour shape, wherein a measured shape of at least some of the green bodies at least partially deviates from the predetermined target contour shape, wherein the deviation includes a popped out portion; and
    firing the green bodies in a kiln to make ceramic bodies, wherein, during firing, the green bodies are each oriented with the popped out portion aligned with a temperature gradient in the kiln such that an average deviation of a measured shape of the ceramic bodies from the predetermined target contour shape is less than the average deviation of the measured shape of the green bodies from the predetermined target contour shape.

2. The method of claim 1, wherein the deviation of the green bodies and the ceramic bodies from the predetermined target contour shape is determined by a technique utilizing laser gauge coordinate measurements (LGCM).

3. The method of claim 2, wherein the technique utilizes at least one parameter selected from the group consisting of template, tubegauge, and circularity.

4. The method of claim 2, wherein the technique utilizes principal component analysis (PCA).

5. The method of claim 1, wherein the kiln is a tunnel kiln.

6. The method of claim 5, wherein the green bodies are moved in a direction in the tunnel kiln and the temperature gradient is parallel to the direction the green bodies are moved.

7. The method of claim 6, wherein the green bodies comprise an extrusion line that intersects the popped out portion, wherein the extrusion line faces the direction the green bodies are moved.

8. The method of claim 5, wherein the green bodies are moved in a direction in the tunnel kiln and the temperature gradient is normal or oblique relative to the direction the green bodies are moved.

9. The method of claim 1, wherein the kiln is a periodic kiln.

10. The method of claim 9, wherein the green bodies comprise an extrusion line, wherein the extrusion line is aligned with the temperature gradient.

11. The method of claim 9, wherein the green bodies comprise an extrusion line, wherein the extrusion line is normal or oblique relative to the temperature gradient.

12. A method of making ceramic bodies, the method comprising:
    extruding green bodies, said green bodies being extruded to a predetermined target contour shape, wherein a measured shape of at least some of the green bodies at least partially deviates from the predetermined target contour shape, wherein the deviation includes a popped out portion;
    firing the green bodies in a kiln to make ceramic bodies, wherein, during firing, at least a majority of the green bodies are oriented with the popped out portion of each green body being aligned in the same direction as a temperature gradient in the kiln.

13. The method of claim 12, wherein during firing, all of the green bodies are oriented in the same direction relative to a temperature gradient in the kiln.

14. The method of claim 13, wherein the kiln is a tunnel kiln.

15. The method of claim 14, wherein the green bodies are moved in a direction in the tunnel kiln and the temperature gradient is parallel to the direction the green bodies are moved.

16. The method of claim 14, wherein the green bodies comprise an extrusion line, wherein the extrusion line intersects the popped out portion and faces the direction the green bodies are moved.

17. The method of claim 14, wherein the green bodies are moved in a direction in the tunnel kiln and the temperature gradient is normal or oblique relative to the direction the green bodies are moved.

18. The method of claim 13, wherein the kiln is a periodic kiln.

19. The method of claim 18, wherein the green bodies comprise an extrusion line, wherein the extrusion line is aligned with the temperature gradient.

20. The method of claim 18, wherein the green bodies comprise an extrusion line, wherein the extrusion line is normal or oblique relative to the temperature gradient.

21. The method of claim 12, wherein an average deviation of a measured shape of the ceramic bodies from the predetermined target contour shape is less than the average deviation of the measured shape of the green bodies from the predetermined target contour shape.

* * * * *